United States Patent
Kobayashi et al.

(10) Patent No.: US 8,848,146 B2
(45) Date of Patent: Sep. 30, 2014

(54) LIQUID CRYSTAL DEVICE, ELECTRONIC DEVICE AND PHASE DIFFERENCE COMPENSATING PLATE

(71) Applicant: Seiko Epson Corporation, Tokyo (JP)

(72) Inventors: Kazu Kobayashi, Kai (JP); Yutaka Tsuchiya, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 126 days.

(21) Appl. No.: 13/684,415

(22) Filed: Nov. 23, 2012

(65) Prior Publication Data

US 2013/0141674 A1 Jun. 6, 2013

(30) Foreign Application Priority Data

Nov. 25, 2011 (JP) ................. 2011-257162

(51) Int. Cl.
*G02F 1/1335* (2006.01)
*G02F 1/1337* (2006.01)
*G02F 1/13363* (2006.01)

(52) U.S. Cl.
CPC ...... *G02F 1/13362* (2013.01); *G02F 1/133634* (2013.01); *G02F 1/133734* (2013.01); *G02F 2413/12* (2013.01)
USPC ............ 349/117; 349/118; 349/119; 349/130

(58) Field of Classification Search
CPC .......... G02F 1/13362; G02F 1/133634; G02F 1/133734; G02F 1/133636; G02F 1/133632; G02F 1/13363; G02F 2413/12; G02F 2202/40; G02F 1/1393; G02F 1/133707; G02F 2001/133742; G02B 5/30
USPC .................................. 349/117, 118, 119, 130
See application file for complete search history.

(56) References Cited

U.S. PATENT DOCUMENTS

| | | | |
|---|---|---|---|
| 8,212,947 B2 * | 7/2012 | Tateno | 349/8 |
| 2012/0200804 A1 * | 8/2012 | Kobayashi | 349/62 |

FOREIGN PATENT DOCUMENTS

JP 2009-145862 A 7/2009

* cited by examiner

*Primary Examiner* — Mike Qi
(74) *Attorney, Agent, or Firm* — ALG Intellectual Property, LLC

(57) ABSTRACT

An O plate is included which includes a phase difference compensating layer which is an assembly of columns obtained by oblique deposition of an anisotropic refractive index medium with respect to a substrate and has negative biaxial refractive index anisotropy. In the O plate, a front surface phase difference value of the O plate in the normal direction is 5-15 nm, and a ratio of Re(−30)/Re(30) is 2.5-5.5.

5 Claims, 14 Drawing Sheets

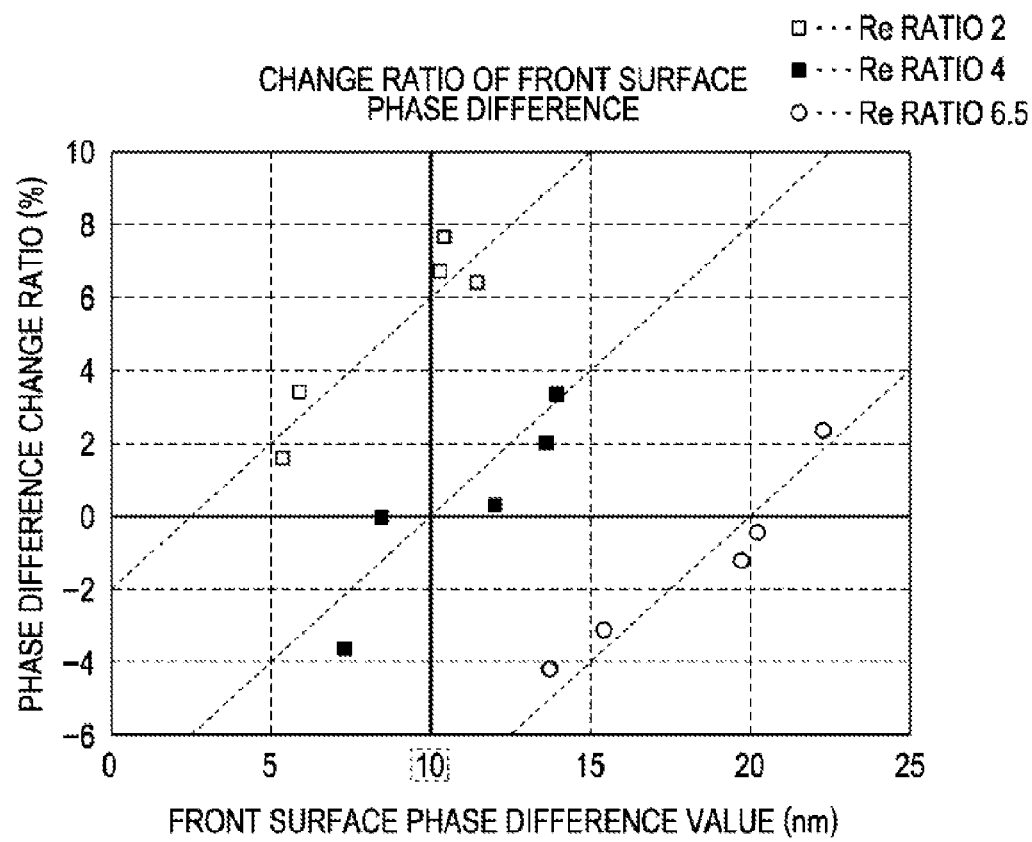

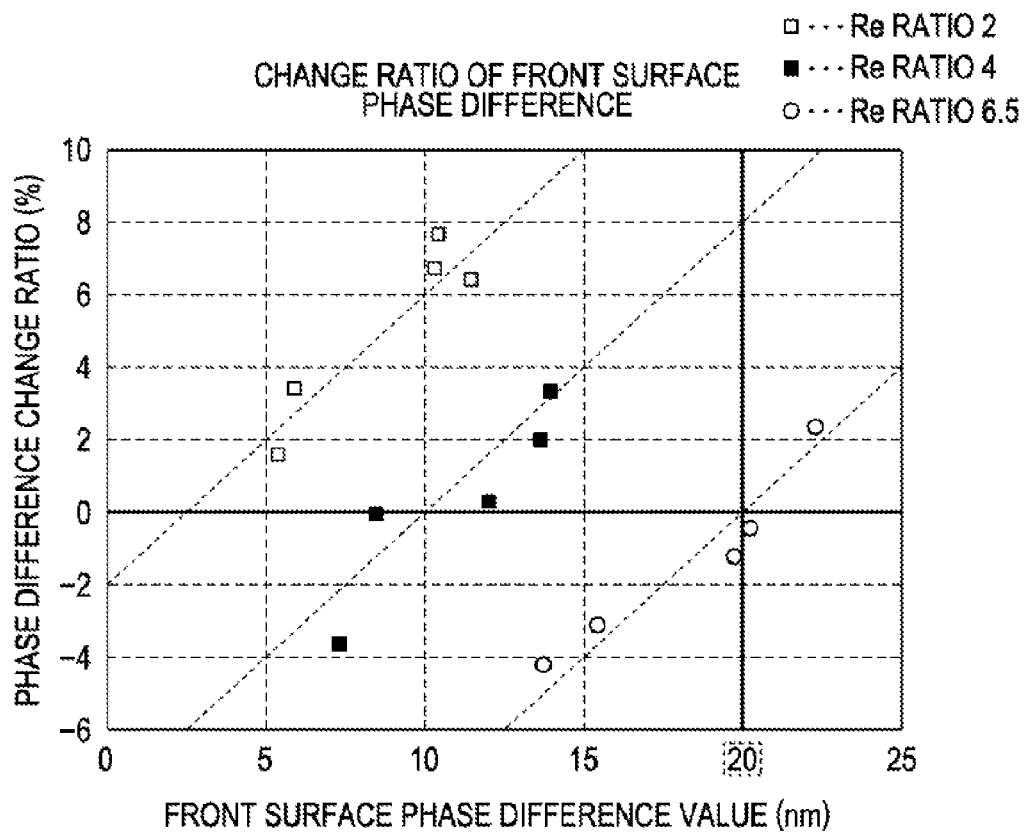

LIQUID CRYSTAL DEVICE, ELECTRONIC DEVICE AND PHASE DIFFERENCE COMPENSATING PLATE

BACKGROUND

1. Technical Field

The present invention relates to a liquid crystal device, an electronic device, and a phase difference compensating plate.

2. Related Art

As the liquid crystal device, for example, a liquid crystal device with an active driving system has been known that includes a transistor as an element for controlling switching on or off a pixel electrode for each pixel. This liquid crystal device has been used for a liquid crystal light valve of a liquid crystal projector, for example.

In detail, a liquid crystal projector has been proposed that includes a liquid crystal light valve in a vertical alignment (hereinafter, referred to as VA) mode, as a liquid crystal light valve having superior contrast when observed from the front. The liquid crystal light valve in the VA mode includes a liquid crystal layer having negative dielectric constant anisotropy and which is interposed between a pair of substrates, and liquid crystal molecules which are approximately vertically aligned in a state where no voltage is applied.

For example, as disclosed in JP-A-2009-145862, as a technology for improving contrast of the liquid crystal light valve, a method of applying pretilt to compensate an optical phase difference value of a liquid crystal layer that is formed of liquid crystal molecules approximately vertically aligned to improve contrast, by using a phase difference compensating element having an optical axis along a thickness direction of a substrate which is a so-called C plate, and using a phase difference compensating element having a biaxial refractive index anisotropy which is a so-called O plate.

However, since the O plate is configured by a deposition film obtained by oblique deposition of an anisotropic refractive index medium, the optical characteristics (for example, a phase difference value and the like) of the O plate may be changed which is caused by humidity of such a case where moisture is included in the liquid crystal device. As a result, there is a problem of a decrease of contrast without a proper phase difference compensation, which relates to reliability.

SUMMARY

Some aspects of the invention can be realized in the following forms or application examples.

APPLICATION EXAMPLE 1

A liquid crystal device according to the Application Example includes a pair of substrates, a liquid crystal layer that is formed of liquid crystal molecules having negative dielectric anisotropy and interposed between the pair of substrates, and a phase difference compensating plate that is disposed in the opposite side to the liquid crystal layer of at least one of the pair of substrates, and includes a support and a phase difference compensating layer which is an assembly of columns obtained by oblique deposition of an anisotropic refractive index medium with respect to the support and has negative biaxial refractive index anisotropy, in which, when a front surface phase difference value of the phase difference compensating plate in the normal direction is set as x, a phase difference value of a first direction which is tilted at 30° in a direction opposite to the growth direction of the columns with the normal direction as a reference is set as Re(30), a phase difference value of a second direction which is tilted at 30° in the growth direction of the columns with the normal direction as a reference is set as Re(−30), and a ratio of Re(−30)/Re(30) is set as y, y is approximated by the following numerical expression.

$$y = 0.25x + 1.5$$

According to the Application Example, the ratio y changes depending on an angle of the growth direction with respect to the normal direction of the columns of the anisotropic refractive index medium of the support. In detail, as the angle of the growth direction of the columns approaches the normal direction, the value of the ratio y becomes smaller, and the further the angle is from the normal direction, the larger the value of the ratio y becomes. The numerical equation is for specifying the density of the columns on the support based on the phase difference value x. A phase difference compensating plate which is hardly influenced by moisture can be provided by controlling the value of the ratio y approximated by the numerical expression, that is, by controlling the density of the column. Accordingly, it is possible to suppress the change of the phase difference value with respect to the change of the humidity, and to suppress fluctuation of contrast. As a result, it is possible to improve a display quality of the liquid crystal device.

APPLICATION EXAMPLE 2

A liquid crystal device according to the Application Example includes a pair of substrates, a liquid crystal layer that is formed of liquid crystal molecules having negative dielectric anisotropy and which is interposed between the pair of substrates, and a phase difference compensating plate that is disposed in the opposite side to the liquid crystal layer of at least one of the pair of substrates, and includes a support and a phase difference compensating layer which is an assembly of columns obtained by oblique deposition of an anisotropic refractive index medium with respect to the support and has negative biaxial refractive index anisotropy, in which, in the phase difference compensating plate, a front surface phase difference value of the phase difference compensating plate in the normal direction is equal to or more than 5 nm and equal to or less than 15 nm, a phase difference value of a first direction which is tilted at 30° in a direction opposite to a growth direction of the columns with the normal direction as a reference is set as Re(30), a phase difference value of a second direction which is tilted at 30° in the growth direction of the columns with the normal direction as a reference is set as Re(−30), and a ratio of Re(−30)/Re(30) is equal to or more than 2.5 and equal to or less than 5.5.

APPLICATION EXAMPLE 3

A liquid crystal device according to the Application Example includes a pair of substrates, a liquid crystal layer that is formed of liquid crystal molecules having negative dielectric anisotropy and which is interposed between the pair of substrates, and a phase difference compensating plate that is disposed in the opposite side to the liquid crystal layer of at least one of the pair of substrates, and includes a support and a phase difference compensating layer which is an assembly of columns obtained by oblique deposition of an anisotropic refractive index medium with respect to the support and has negative biaxial refractive index anisotropy, in which, in the phase difference compensating plate, a front surface phase difference value of the phase difference compensating plate in the normal direction is equal to or more than 15 nm and equal to or less than 25 nm, a phase difference value of a first direction which is tilted at 30° in a direction opposite to a growth direction of the columns with the normal direction as a reference is set as Re(30), a phase difference value of a second direction which is tilted at 30° in the growth direction of the columns with the normal direction as a reference is set as Re(−30), and a ratio of Re(−30)/Re(30) is equal to or more than 6 and equal to or less than 7.

APPLICATION EXAMPLE 4

It is preferable that the liquid crystal device according to the above described Application Examples include a pair of polarizing plates which is disposed to interpose the pair of substrates therebetween, and the phase difference compensating plate be disposed between the pair of polarizing plates.

According to the Application Example, since the phase difference compensating plate which satisfies the conditions described above is disposed between the pair of polarizing plates, it is possible to provide for example, a transmissive liquid crystal device in which the fluctuation of the contrast is suppressed.

APPLICATION EXAMPLE 5

An electronic device according to the Application Example includes the liquid crystal device described above.

According to the Application Example, since the liquid crystal device described above is included, it is possible to provide an electronic device in which the fluctuation of the contrast is suppressed and the display quality is improved.

APPLICATION EXAMPLE 6

A phase difference compensating plate according to the Application Example that is disposed in the opposite side to a liquid crystal layer of at least one of a pair of substrates of a liquid crystal device including the pair of substrates, and the liquid crystal layer that is formed of liquid crystal molecules having negative dielectric anisotropy and interposed between the pair of substrates, includes a support and a phase difference compensating layer which is an assembly of columns obtained by oblique deposition of an anisotropic refractive index medium with respect to the support and has negative biaxial refractive index anisotropy, in which, when a front surface phase difference value of the phase difference compensating plate in the normal direction is set as x, a phase difference value of a first direction which is tilted at 30° in a direction opposite to the growth direction of the columns with the normal direction as a reference is set as Re(30), a phase difference value of a second direction which is tilted at 30° in the growth direction of the columns with the normal direction as a reference is set as Re(−30), and a ratio of Re(−30)/Re(30) is set as y, y is approximated by the following numerical expression.

$$y=0.25x+1.5$$

According to the Application Example, the ratio y changes depending on an angle of the growth direction with respect to the normal direction of the columns of the anisotropic refractive index medium of the support. In detail, as the angle of the growth direction of the columns is closer to the normal direction, the value of the ratio y becomes smaller, and as the angle is further from the normal direction, the value of the ratio y becomes larger. The numerical expression is for assuming the density of the columns on the support based on the phase difference value x. A phase difference compensating plate which is hardly influenced by moisture can be provided by controlling the value of the ratio y approximated by the numerical expression, that is, by controlling the density of the column. Accordingly, it is possible to suppress the change of the phase difference value with respect to the change of the humidity, and to suppress a fluctuation of contrast.

APPLICATION EXAMPLE 7

A phase difference compensating plate according to the Application Example that is disposed in the opposite side to a liquid crystal layer of at least one of a pair of substrates of a liquid crystal device including the pair of substrates, and the liquid crystal layer that is formed of liquid crystal molecules having negative dielectric anisotropy and interposed between the pair of substrates, includes a support and a phase difference compensating layer which is an assembly of columns obtained by oblique deposition of an anisotropic refractive index medium with respect to the support and which has negative biaxial refractive index anisotropy, in which, a front surface phase difference value of the phase difference compensating plate in the normal direction is equal to or more than 5 nm and equal to or less than 15 nm, a phase difference value of a first direction which is tilted at 30° in a direction opposite to a growth direction of the columns with the normal direction as a reference is set as Re(30), a phase difference value of a second direction which is tilted at 30° in the growth direction of the columns with the normal direction as a reference is set as Re(−30), and a ratio of Re(−30)/Re(30) is equal to or more than 2.5 and equal to or less than 5.5.

APPLICATION EXAMPLE 8

A phase difference compensating plate according to the Application Example that is disposed in the opposite side to a liquid crystal layer of at least one of a pair of substrates of a liquid crystal device including the pair of substrates, and the liquid crystal layer that is formed of liquid crystal molecules having negative dielectric anisotropy and interposed between the pair of substrates, includes a support and a phase difference compensating layer which is an assembly of columns obtained by oblique deposition of an anisotropic refractive index medium with respect to the support and which has negative biaxial refractive index anisotropy, in which, a front surface phase difference value of the phase difference compensating plate in the normal direction is equal to or more than 15 nm and equal to or less than 25 nm, a phase difference value of a first direction which is tilted at 30° in a direction opposite to a growth direction of the columns with the normal direction as a reference is set as Re(30), a phase difference value of a second direction which is tilted at 30° in the growth direction of the columns with the normal direction as a reference is set as Re(−30), and a ratio of Re(−30)/Re(30) is equal to or more than 6 and equal to or less than 7.

BRIEF DESCRIPTION OF THE DRAWINGS

The invention will be described with reference to the accompanying drawings, wherein like numbers reference like elements.

FIG. 8 is a graph showing a relationship between front surface phase difference value and phase difference change ratio in when changing the ratio (Re ratio) of the phase difference value.

FIG. 9 is a table showing a relationship between a ratio of a phase difference value of an O plate and contrast.

FIG. 14 is a graph showing a relationship between a front surface phase difference value and a phase difference change ratio in a case of changing the ratio (Re ratio) of the phase difference value.

FIG. 15 is a table showing a relationship between a ratio of a phase difference value of an O plate and contrast.

DESCRIPTION OF THE EXEMPLARY EMBODIMENTS

Hereinafter, embodiments of the invention will be described with reference to the accompanying drawings. The accompanying drawings herein are appropriately enlarged or reduced so that the illustrated portion is recognizable.

In the following embodiments, a case of "on a substrate" for example, indicates a case of disposing on a substrate to abut thereto, a case of disposing on a substrate through other components, or a case of disposing on a substrate to abut to a part thereof and disposing another part through other components.

In the embodiments, an active matrix type liquid crystal device including a thin film transistor (TFT) as a switching element of pixels will be described as an example. This liquid crystal device, for example, can be suitably used as a light modulation element (liquid crystal light valve) of a projection type display device (liquid crystal projector) which will be described later.

Figure 1:
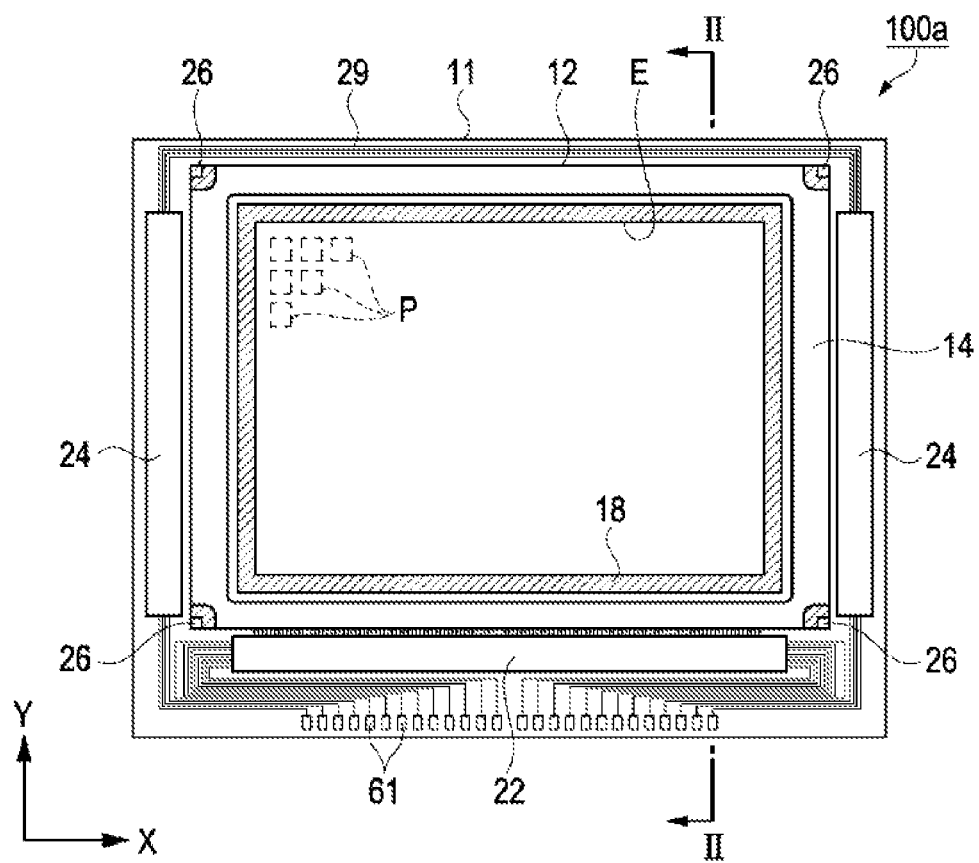
FIG. 1 is a schematic plan view showing a configuration of a liquid crystal panel configuring a liquid crystal device of a First Embodiment.
Figure 2:
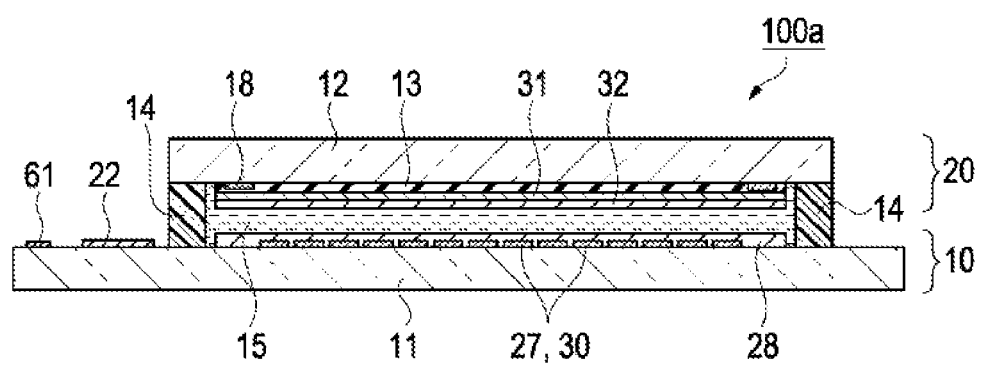
FIG. 2 is a schematic cross-sectional view taken along line II-II of a liquid crystal panel shown in FIG. 1.
Figure 3:
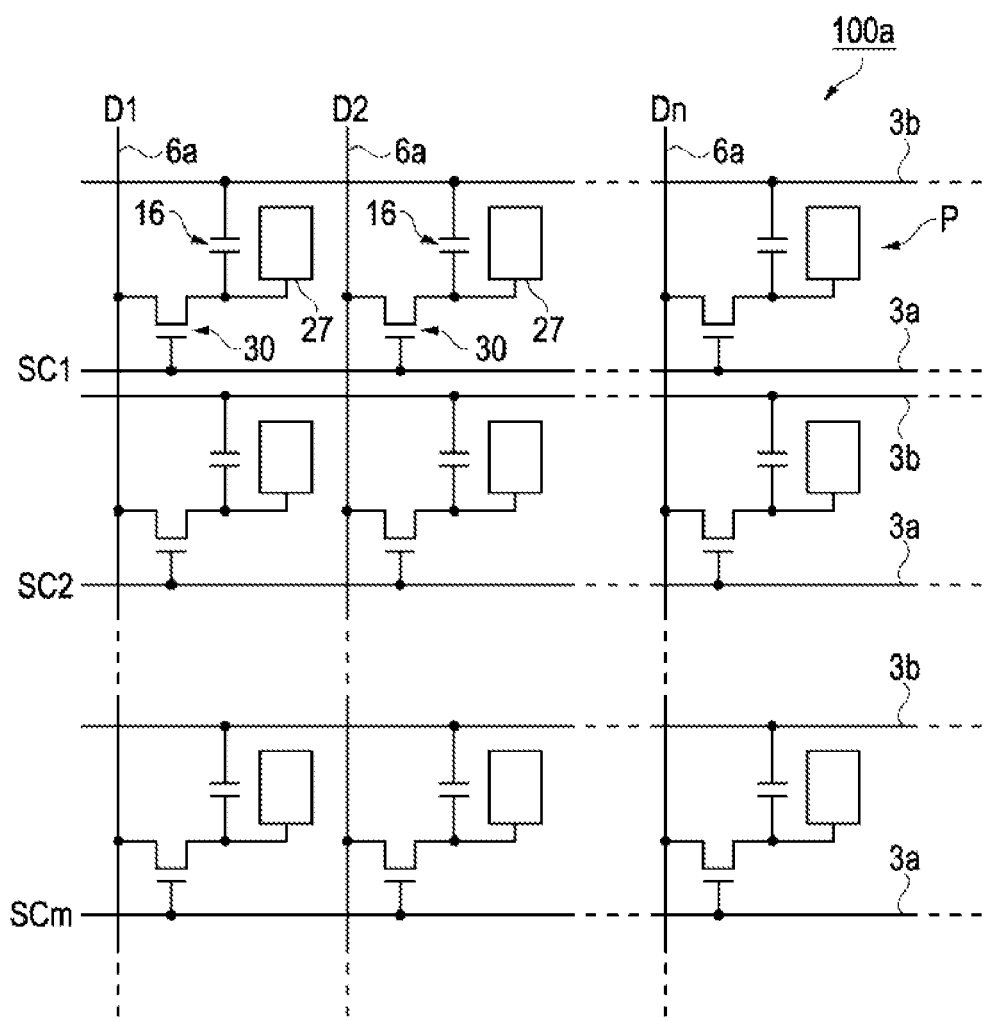
FIG. 3 is a view of an equivalent circuit showing an electrical configuration of a liquid crystal panel.

First Embodiment
Configuration of Liquid Crystal Panel configuring Liquid Crystal Device FIG. 1 is a schematic plan view showing a configuration of a liquid crystal panel configuring a liquid crystal device. FIG. 2 is a schematic cross-sectional view along line II-II of the liquid crystal panel shown in FIG. 1. FIG. 3 is a view of an equivalent circuit showing an electrical configuration of the liquid crystal panel. Hereinafter, the configuration of the liquid crystal panel will be described referring to FIGS. 1 to 3.

As shown in FIGS. 1 and 2, a liquid crystal panel 100a of the embodiment includes an element substrate 10 and an opposing substrate 20 which are disposed opposite to each other, and a liquid crystal layer 15 which is interposed between the pair of substrates. For example, a transparent substrate such as a glass substrate and a quartz substrate is used for a first substrate 11 configuring the element substrate 10 and a second substrate 12 configuring the opposing substrate 20. In addition, a silicon substrate may be used for the first substrate 11.

The element substrate 10 is larger than the opposing substrate 20, both substrates are joined by a sealing material 14 which is disposed along the outer periphery of the opposing substrate 20, and in the space therebetween, a liquid crystal layer 15 in which the liquid crystal having negative dielectric anisotropy is included is provided. For the sealing material 14, for example, an adhesive such as a thermosetting or an ultraviolet curable resin is used. A gapping material for maintaining the space between the pair of substrates constant is mixed in the sealing material 14.

A display region E in which a plurality of pixels P are arranged is provided inside the sealing material 14. Between the sealing material 14 and the display region E, a light shielding layer 18 (cutout unit) which is formed of a light shielding metal or metallic oxide for example, is disposed so as to surround the display region E. In addition, the display region E may include a plurality of dummy pixels which is disposed so as to surround the plurality of pixels P contributing to the display.

A data line driving circuit 22 is provided between one side portion of the first substrate 11 and the sealing material 14 along the one side portion. A check circuit (not shown) is provided in the inner side of the sealing material 14 along another side portion opposing the one side portion described above. In addition, two scanning line driving circuits 24 are provided on a third and fourth side portions which are perpendicular to the one side portion and oppose to each other. A plurality of wiring 29 which connect the two scanning line driving circuits 24 are provided on the another side portion opposing the one side portion.

The wiring which connect the data line driving circuit 22 and the scanning line driving circuit 24 are connected to a plurality of external connecting terminals 61 which are arranged along the one side portion. Hereinafter, the embodiments will be described by setting the direction along the one side portion as an X direction, and the direction along the other two side portions which are perpendicular to the one side portion and oppose to each other as a Y direction.

As shown in FIG. 2, on a surface of the liquid crystal layer 15 side of the first substrate 11, a pixel electrode 27 and a thin film transistor 30 (hereinafter, referred to as a "TFT 30") as a switching element which are provided for each pixel P and have the light reflectivity, a signal wiring, and a first alignment film 28 covering the above components are formed.

The pixel electrode 27 can be formed using for example Al (aluminum) or Ag (silver), or a compound such as a metallic alloy or a metallic oxide thereof having good light reflectivity. In addition, a light shielding structure is employed that prevents unstable switching operation caused by the incident light to a semiconductor layer in the TFT 30. As described above, the element substrate 10 includes at least the TFT 30, the pixel electrode 27, and the first alignment film 28.

The light shielding layer 18, an insulating layer 13 formed to cover the light shielding film, a common electrode 31 provided to cover the insulating layer 13, and a second alignment film 32 covering the common electrode 31 are provided on the surface of the liquid crystal layer 15 side of the second substrate 12.

The common electrode 31 is formed of a transparent conductive film such as ITO (Indium Tin Oxide) for example, covers the insulating layer and the like, and is electrically connected to the wiring of the element substrate 10 side by top and bottom conducting portions 26 formed on the four corners of the opposing substrate 20 as shown in FIG. 1.

The first alignment film 28 covering the pixel electrode 27 and the second alignment film 32 covering the common electrode 31 are inorganic alignment films, and are selected based on the optical design of the liquid crystal panel 100a. For example, the films are formed of inorganic materials such as $SiO_x$ (silicon oxide) using a vapor-phase epitaxial method to obtain liquid crystal molecules approximately vertically aligned. As described above, the opposing substrate 20 includes at least the common electrode 31 and the second alignment film 32.

The liquid crystal panel 100a described above is a reflective type, and the optical design of a normally black mode which performs dark display in a case of not driving the pixels P or a normally white mode which performs bright display in a case of not driving. According to the optical design, a polarizing plate is disposed on the light incident side (emission side) and used.

As shown in FIG. 3, the liquid crystal panel 100a includes at least a plurality of scanning lines 3a and a plurality of data lines 6a which are insulated and perpendicular to each other, and a capacity line 3b which is extended parallel to the scanning line 3a in the display region E. The direction in which the scanning line 3a is extended is the X direction and the direction in which the data line 6a is extended is the Y direction. The capacity line 3b can also be disposed so as to extend parallel to the data line 6a.

The pixel electrode 27, TFT 30, and a content element 16 are provided on the scanning line 3a, the data line 6a, and the capacity line 3b, and in a region partitioned by the kinds of the signal lines, and configure a pixel circuit of the pixels P.

The scanning line 3a is electrically connected to the gate of TFT 30, and the data line 6a is electrically connected to a data line side source/drain region of the TFT 30. The pixel electrode 27 is electrically connected to the pixel electrode side source/drain region of the TFT 30.

The data line 6a is connected to the data line driving circuit 22 (see FIG. 1) and supplies image signals D1, D2, . . . , Dn supplied from the data line driving circuit 22 to the pixels P. The scanning line 3a is connected to the scanning line driving circuit 24 (see FIG. 1) and supplies scanning signals SC1, SC2, . . . , SCm supplied from the scanning line driving circuit 24 to each pixel P.

The image signals D1 to Dn supplied from the data line driving circuit 22 to the data line 6a may be supplied line-sequentially in this order, and may be supplied for each group with respect to the plurality of data lines 6a which lie next to each other. The scanning line driving circuit 24 supplies the scanning signals SC1 to SCm to the scanning lines 3a line-sequentially at the predetermined time for each pulse.

Since the TFT 30 as the switching element is turned to the on state only for a given time by the input of the scanning signals SC1 to SCm, the liquid crystal panel 100a is configured that the image signals D1 to Dn supplied from the data line 6a are written in the pixel electrode 27 at the predetermined time. The image signals D1 to Dn at the predetermined level written in the liquid crystal layer 15 through the pixel electrode 27 is held between the pixel electrode 27 and the common electrode 31 disposed to be opposed through the liquid crystal layer 15 for a given time.

The content element 16 is connected in parallel to the liquid crystal content formed between the pixel electrode 27 and the common electrode 31 to prevent a leakage of the held image signals D1 to Dn. The content element 16 is provided between the pixel electrode side source/drain region of the TFT 30 and the capacity line 3b.

Figure 4:
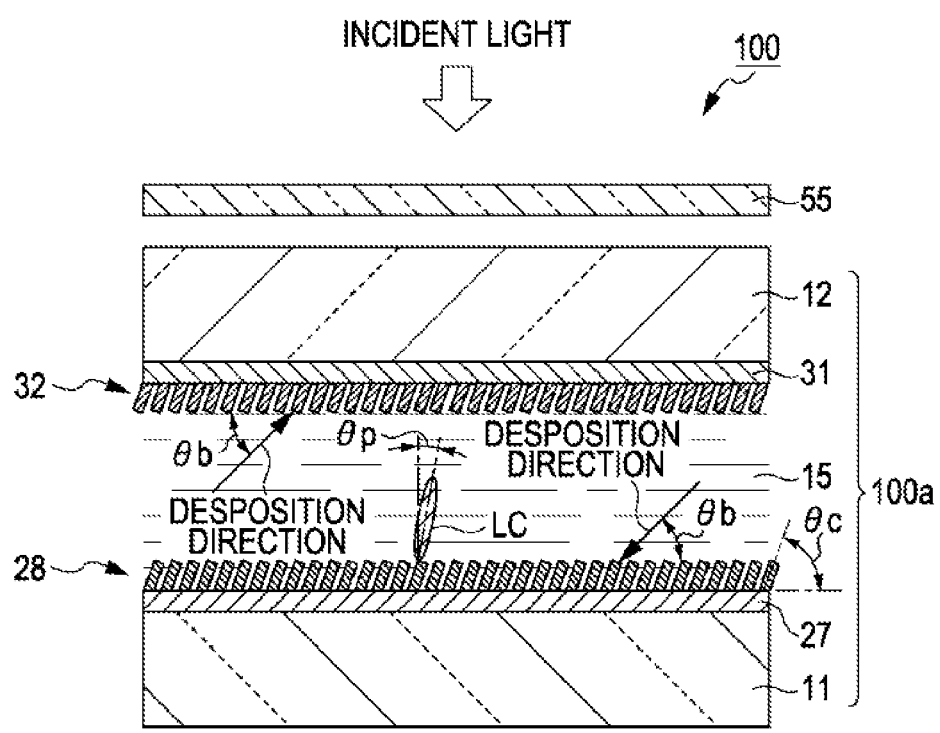
FIG. 4 is a schematic cross-sectional view showing a configuration of a liquid crystal device.

FIG. 4 is a schematic cross-sectional view showing the configuration of the liquid crystal device. Hereinafter, the configuration of the liquid crystal device will be described referring to FIG. 4. FIG. 4 is a cross-sectional view in a case of cutting along a deposition direction of oblique deposition.

As shown in FIG. 4, the first alignment film 28 and the second alignment film 32 are assemblies of columnar crystalline bodies (columns) which are obtained by performing the oblique deposition of inorganic alignment materials such as silicon oxide for example, with respect to each of the corresponding substrate surfaces from the predetermined direction. An angle θb of the deposition direction of the alignment films 28 and 32 with respect to the substrate surface which face the liquid crystal layer 15 is about 45°. In addition, an angle θc of the growth direction of the columns with respect to the substrate surface is about 70°. According to the first alignment film 28 and the second alignment film 32 described above, it is possible that a liquid crystal molecule LC having negative dielectric anisotropy is approximately vertically aligned by applying pretilt angle θp which is tilted in the predetermined azimuth direction with respect to the alignment film surface. The first alignment film 28 and the second alignment film 32 are formed so as the pretilt angle θp is about 3° to 5° with respect to the normal direction of each substrate.

In order to compensate the optical phase difference of the thickness direction of the liquid crystal layer 15 caused by the alignment state of the liquid crystal molecule LC described above, the liquid crystal device 100 includes an O plate 55 as a phase difference compensating plate of the invention which is disposed on the emission side of the light of the liquid crystal panel 100a. When a driving voltage is applied between the pixel electrode 27 and the common electrode 31 to drive the liquid crystal layer 15, since the liquid crystal molecule LC falls in the azimuth direction of the pretilt, it is optically disposed for high contrast.

The O plate 55 is the phase difference compensating plate including a phase difference compensating layer of which an optical axis has a biaxial negative refractive index anisotropy along the thickness direction. Hereinafter, the O plate 55 will be described in detail referring to FIGS. 5 to 7.

Figure 5:
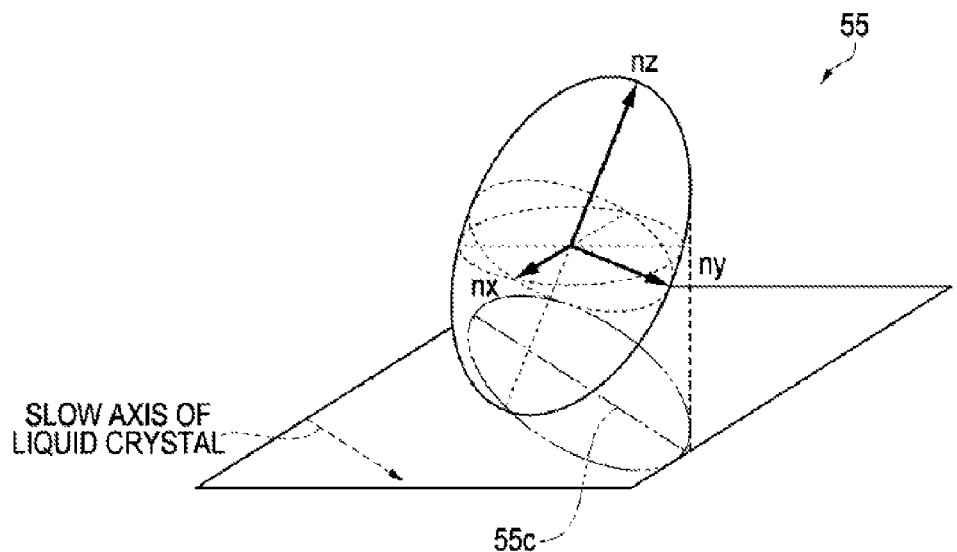
FIG. 5 is a schematic view illustrating optical anisotropy of an O plate.
Figure 6:
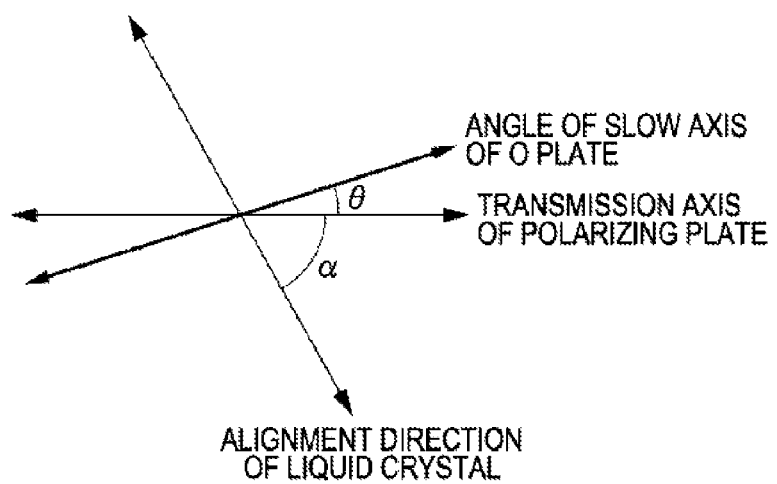
FIG. 6 is a view showing a relationship between an alignment direction of a liquid crystal molecule, a transmission axis of a wire grid polarizing plate, and a slow axis of an O plate.
Figure 7:
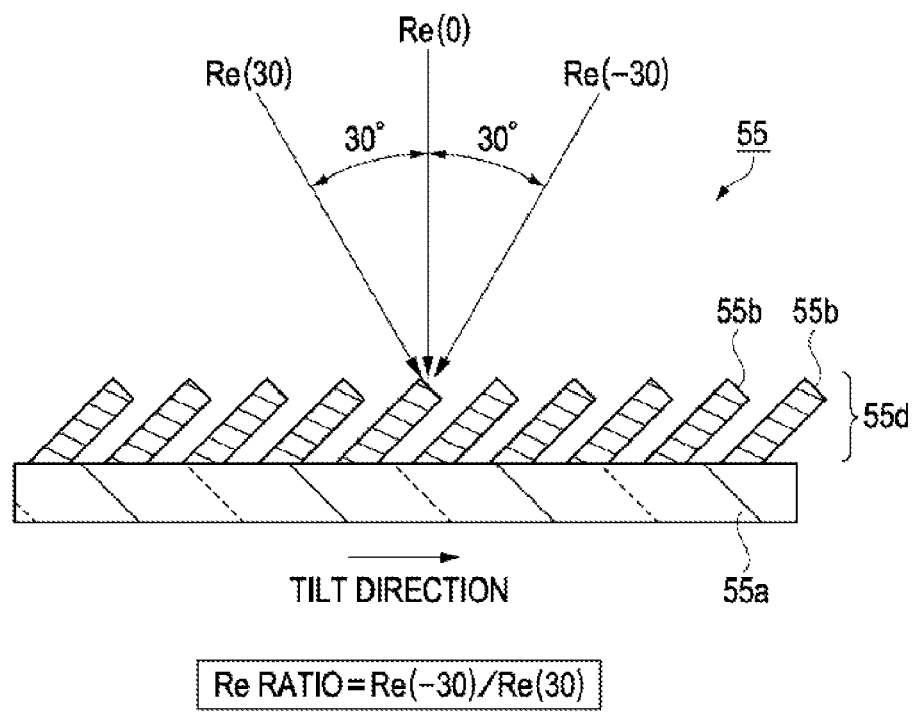
FIG. 7 is a schematic view showing a specific configuration of an O plate.

FIG. 5 is a schematic view for illustrating the optical anisotropy of the O plate. FIG. 6 is a view showing a relationship between an alignment direction of a liquid molecule, a transmission axis of a wire grid polarizing plate, and a slow axis of the O plate. FIG. 7 is a schematic view showing a detailed configuration of the O plate. Hereinafter, the structure of the O plate will be described referring to FIGS. 5 to 7.

As shown in an index ellipsoid in FIG. 5, the O plate 55 is a birefringent body with the relationship of refractive index of each direction as nx<ny<nz and having biaxial refractive index anisotropy. The O plate 55 includes a slow axis by the inorganic material (anisotropic refractive index medium) forming columns 55b (see FIG. 7). The slow axis of the O plate 55 matches with a long axis 55c of an oval which is obtained by projecting the index ellipsoid shown in FIG. 5 on the substrate (surface of the substrate) when seen from the normal direction of the substrate.

As shown in FIG. 6, in the embodiment, when seen from the direction along an optical axis of the light incident to the liquid crystal panel 100a, an angle α formed by the alignment direction of the liquid crystal molecule LC and a transmission axis of a wire grid polarizing plate 1263 (see FIG. 12) which will be described later is set as 45° (135° for example, and an angle θ formed by the transmission axis of the wire grid polarizing plate 1263 and the slow axis of the O plate 55 is set as 3° for example. Further, the transmission axis of the wire grid polarizing plate 1263 and the transmission axis of an auxiliary polarizing plate 1264 (see FIG. 12) are the same.

As shown in FIG. 7, the O plate 55 is formed by performing oblique deposition of an inorganic material (anisotropic refractive index medium) such as $Ta_2O_5$ on one surface of a substrate 55a which is a translucent support made of quartz glass for example. The O plate 55 includes a phase difference compensating layer 55d having columns 55b (columnar structure) which is obtained when the inorganic material is grown along the oblique direction when seen microscopically. That is, the O plate 55 is an assembly of the columns 55b obtained by oblique deposition of the anisotropic refractive index medium and the optical axis thereof includes negative biaxial refractive index anisotropy along the thickness direction of the substrate 55a. The phase difference compensating layer 55d formed by the structure described above generates a phase difference caused by the microstructure.

In the O plate 55 of the embodiment, when a front surface phase difference value of the O plate 55 in the normal direction is set as x (Re(0)), a phase difference value of a first direction which is tilted at 30° in the direction opposite to the growth direction (displayed as a tilt direction in FIG. 7) of the columns 55b with the normal direction as a reference is set as Re (30), a phase difference value of a second direction which is tilted at 30° in the growth direction of the columns 55b is set as Re (−30), and a ratio of Re(−30)/Re(30) is set as y, y is approximated by the following numerical expression (1).

$$y=0.25x+1.5 \tag{1}$$

In detail, the ratio y (the ratio of the phase difference value: Re ratio) of Re(−30)/Re(30) is equal to or more than 2.5 and equal to or less than 5.5, and more preferably about equal to or more than 3.5 and equal to or less than 4.5 and the front surface phase difference value Re(0) of the O plate 55 in the normal direction is equal to or more than 5 nm and equal to or less than 15 nm.

FIG. 8 is a graph showing a relationship between the front surface phase difference value and the phase difference change ratio in a case of changing the ratio (Re ratio) of the phase difference values. FIG. 9 is a table showing a relationship between the phase difference value of the O plate and the contrast. Hereinafter, the optical characteristics of the O plate 55 will be described referring to FIGS. 8 and 9.

In the graph shown in FIG. 8, the horizontal axis is a value of the front surface phase difference value and shows 0 nm to 25 nm. Meanwhile, the vertical axis is the phase difference change ratio and shows −6% to +10%.

In detail, the graph shows the relationship between the front surface phase difference value Re(0) and the phase difference change ratio in a case where the ratio of the phase difference value (Re ratio) is "2", "4", and "6.5", in particular. In addition, the graph shows the phase difference change ratio of the front surface phase difference value after 30 minutes from when the reference temperature of the O plate 55 is changed from 25° C. (about 40% of relative humidity) to 100° C. (about 0% of relative humidity)

It is desired that the phase difference change by the change of the humidity be 0%, however, it varies by the fluctuation of the front surface phase difference value Re(0). The front surface phase difference value Re(0) of the O plate 55 fluctuates by the growth state of the columns 55b by the oblique deposition.

When the front surface phase difference value Re(0) is 10 nm, the phase difference change ratio in a case where the Re ratio is "2" is 7%. In a case where the Re ratio is "4", the phase difference change ratio is 0%. That is, even though the front surface phase difference value Re(0) varies in a range of 5 nm to 15 nm, in a case where the Re ratio is "4" than in a case where the Re ratio is "2", the phase difference change ratio can fall in a range of about −4% to about 4%. In a case where the Re ratio is "2", since when the front surface phase difference value Re(0) varies in the range of 5 nm to 15 nm, the phase difference change ratio is about 2% to about 8% and a deviation from the desired front surface phase difference value becomes large, it is not preferable in a viewpoint of optical compensation. That is, Re ratio 4 can make the fluctuation of the contrast smaller than Re ratio 2.

By setting as described above, the change of the index ellipsoid of the O plate 55 with respect to the change of the humidity does not affect to the change of the front surface phase difference value. That is, by using such O plate 55, it is possible to make it difficult to be influenced of moisture. That is, even with the change of the humidity, it is possible to perform appropriate optical compensation. Accordingly, it is possible to suppress the fluctuation of the contrast. As a result, it is possible to improve the display quality of the liquid crystal device 100.

In addition, a table shown in FIG. 9 shows a state of the contrast in a case where the ratio of the phase difference value (Re ratio) is changed while the front surface phase difference value Re(0) of the O plate 55 is constant. In detail, the table shows degree of the contrast in a case where the front surface phase difference value Re (0) is set as 10 nm and the ratio of the phase difference value is changed to "2", "4", and "6.5".

In a case where the front surface phase difference value Re(0) is set as 10 nm, when the ratio of the phase difference value is "2", the contrast is Δ. When the ratio of the phase difference value is "4", the contrast is O. When the ratio of the phase difference value is "6.5", the contrast is Δ. From the above result, by considering the variation in the formation of the phase difference compensating layer 55d of the O plate 55, when the front surface phase difference value Re(0) is equal to or more than 5 nm and equal to or less than 15 nm, the ratio of the phase difference value (Re ratio) is preferable to be equal to or more than 2.5 and equal to or less than 5.5, and more preferably about equal to or more than 3.5 and equal to or less than 4.5.

Configuration of Electronic Device

Figure 10:
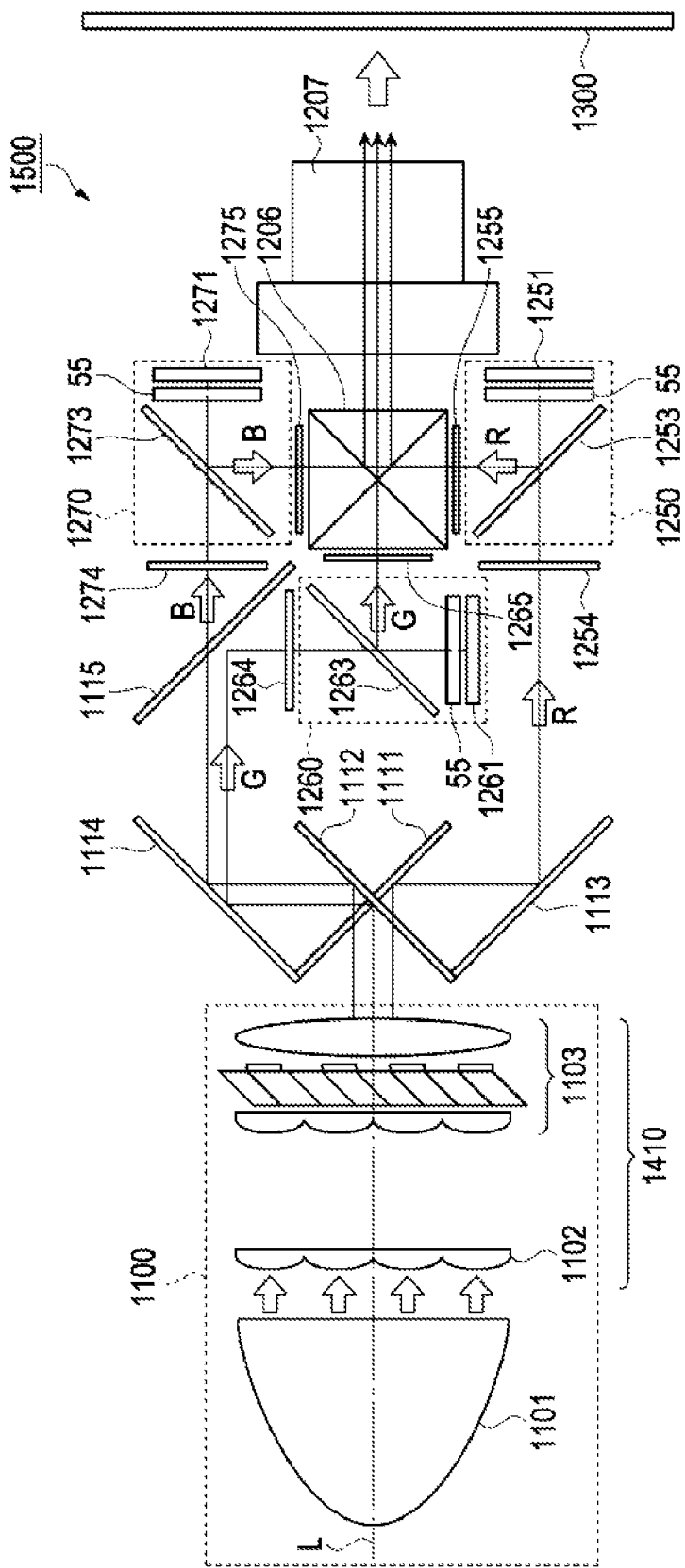
FIG. 10 is a schematic view showing a configuration of an electronic device including a liquid crystal device.
Figure 11:
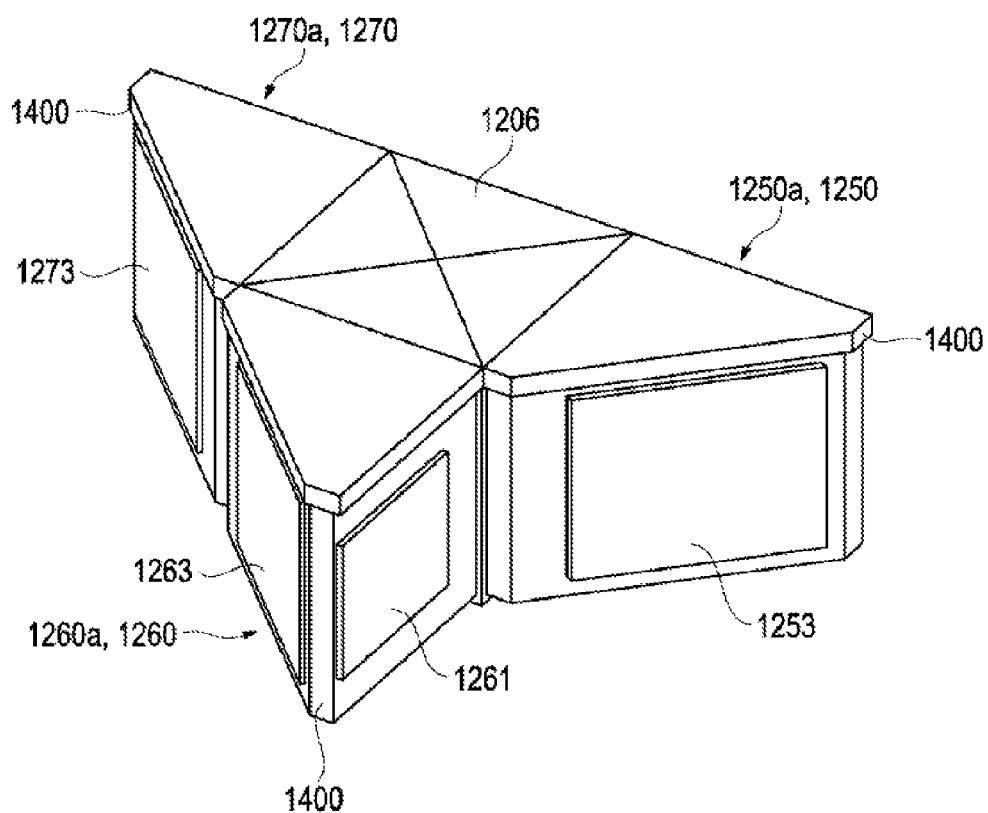
FIG. 11 is a perspective view showing a configuration of the vicinity of a liquid crystal light valve of a projector.
Figure 12:
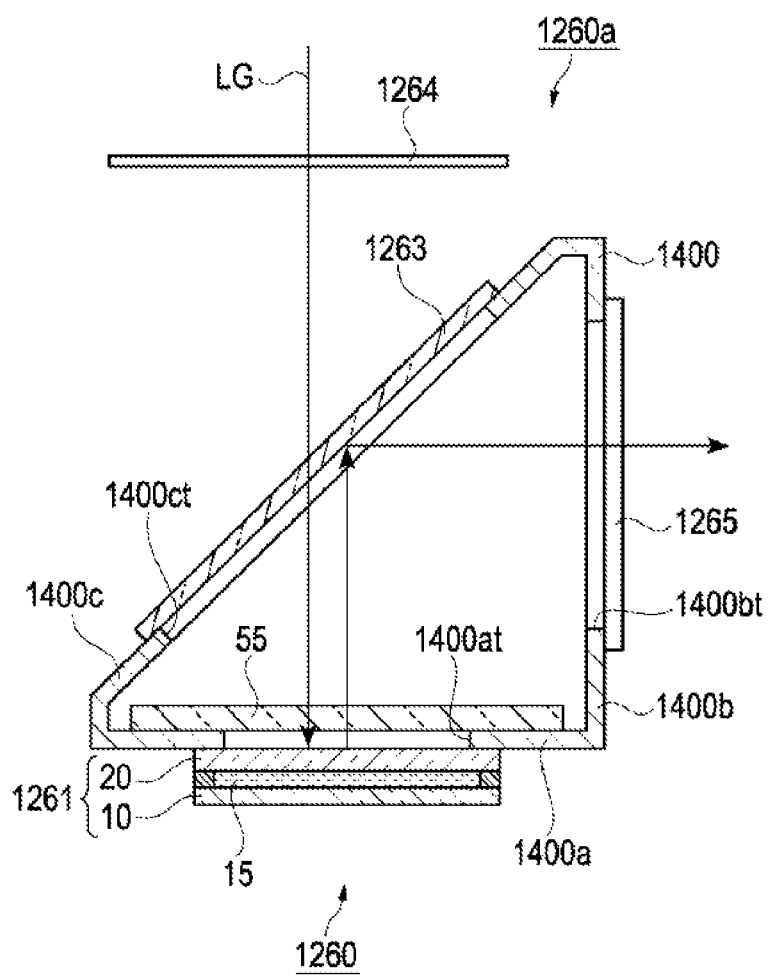
FIG. 12 is a cross-sectional view showing a configuration of a triangular prism unit holding a liquid crystal light valve.

FIG. 10 is a schematic view showing a configuration of an electronic device (projection display device of reflection type: liquid crystal projector) including the above described liquid crystal device. FIG. 11 is a perspective view showing a configuration of the vicinity of the liquid crystal light valve of the projector. FIG. 12 is a cross-sectional view showing a configuration of the triangular prism unit holding the liquid crystal light valve. Hereinafter, the configuration of the electronic device will be described referring to FIGS. 10 to 12.

As shown in FIG. 10, the liquid crystal projector 1500 as the electronic device of the embodiment includes a polarized illuminating device 1100 disposed along a system optical axis L, three dichroic mirrors 1111, 1112, and 1115, two reflective mirror 1113 and 1114, three reflective liquid crystal light valve 1250, 1260 and 1270 as light modulation element, a cross dichroic prism 1206, and a projection lens 1207.

The polarized illuminating device 1100 schematically includes a lamp unit 1101 as a light source formed of a white light source such as a halogen lamp, integrator lens 1102, and a polarization converting element 1103.

A polarizing beam emitted from the polarized illuminating device 1100 enters the dichroic mirror 1111 and the dichroic mirror 1112 which are disposed to be orthogonal to each other. The dichroic mirror 1111 as a light isolating element reflects red light (R) among the incident polarizing beam. Another dichroic mirror 1112 as the light isolating element reflects green light (G) and blue light (B) among the incident polarizing beam.

The reflected red light (R) is reflected again by the reflective mirror 1113 and enters to the liquid crystal light valve 1250. Meanwhile, the reflected green light (G) and the blue light (B) are reflected again by the reflective mirror 1114 and enter to the dichroic mirror 1115 as the light isolating element. The dichroic mirror 1115 reflects the green light (G) and penetrates the blue light (B). The reflected green light (G) enters to the liquid crystal light valve 1260. The penetrated blue light (B) enters the liquid crystal light valve 1270.

The liquid crystal light valve 1250 includes a reflective liquid crystal panel 1251, the O plate 55, and a wire grid polarizing plate 1253 as a reflective polarizing element.

The liquid crystal light valve 1250 is disposed so that the red light (R) reflected by the wire grid polarizing plate 1253 enters vertically to the incident surface of the cross dichroic prism 1206. In addition, an auxiliary polarizing plate 1254 compensating the degree of polarization of the wire grid polarizing plate 1253 is disposed in the incident side of the red light (R) of the liquid crystal light valve 1250, and another auxiliary polarizing plate 1255 is disposed along the incident surface of the cross dichroic prism 1206 in the emission side of the red light (R). When a polarizing beam splitter is used as the reflective polarizing element, a pair of auxiliary polarizing plates 1254 and 1255 can be omitted.

The configuration of such reflective liquid crystal light valve 1250 and disposition of each configuration are same in a case of other reflective liquid crystal light valves 1260 and 1270.

Each colored light entered to the liquid crystal light valves 1250, 1260, and 1270 is modulated based on image information, and enters to the cross dichroic prism 1206 through the wire grid polarizing plates 1253, 1263, and 1273 again. In the cross dichroic prism 1206, each colored light is combined, the combined light is projected onto a screen 1300 by the projection lens 1207, and an image is expanded and displayed.

In the embodiment, the liquid crystal panel 100*a* of the above described embodiment is used as the reflective liquid crystal panels 1251, 1261, and 1271 of the liquid crystal light valves 1250, 1260, and 1270.

According to such liquid crystal projector 1500, since the reflective liquid crystal device 100 is used as the liquid crystal light valves 1250, 1260, and 1270, it is possible to perform the phase difference compensation and the reflective liquid crystal projector 1500 having high display quality can be provided.

In a case of the embodiment, as shown in FIG. 11, all of an image formation optical system for red light 1250*a*, an image formation optical system for green light 1260*a*, and an image formation optical system for blue light 1270*a* are unitized and have the same configurations. The three unitized image formation optical systems 1250*a*, 1260*a*, and 1270*a* come into contact with three light incident surfaces of the cross dichroic prism 1206. Herein as the representative of the image formation optical system, the configuration of the image formation optical system for green light 1260*a* will be described.

As shown in FIG. 12, the image formation optical system for green light 1260*a* includes an auxiliary polarizing plate 1264, the wire grid polarizing plate 1263, the liquid crystal light valve 1260 for green light, the O plate 55, and an auxiliary polarizing plate 1265. Among these constituent elements, except the auxiliary polarizing plate 1264, the wire grid polarizing plate 1263, the liquid crystal light valve 1260 for green light, the O plate 55, and the auxiliary polarizing plate 1265 are fixed to the housing 1400 having an approximate triangular prism shape. The housing 1400 is configured of a high thermal conductive material such as aluminum or the like, for example.

Opening portions 1400*at*, 1400*bt*, and 1400*ct* for passing through the light are provided on three side surfaces 1400*a*, 1400*b*, and 1400*c* of the housing 1400, respectively. Among the three side surface 1400*a*, 1400*b*, and 1400*c* of the housing 1400, two surfaces that come into contact with each other in orthogonal manner are set as a first side surface 1400*a*, and a second side surface 1400*b*, and a surface that comes into contact with the first side surface 1400*a* and the second side surface 1400*b* by 45° degree is set as a third side surface 1400*c*.

The liquid crystal light valve 1260 for green light is fixed to the outer surface side of the first side surface 1400*a* so as to close the opening portion 1400*at*, and the O plate 55 is fixed to the inner surface side of the first side surface 1400*a* so as to close the opening portion 1400*at*. The auxiliary polarizing plate 1265 is fixed to the outer surface side of the second side surface 1400*b* so as to close the opening portion 1400*bt*. The wire grid polarizing plate 1263 is fixed to the outer surface side of the third side surface 1400*c* so as to close the opening portion 1400*ct*. By the configuration described above, the inside of the housing 1400 is an enclosed space.

In the image formation optical system for green light 1260*a*, green light LG isolated from the source light enters to the auxiliary polarizing plate 1264. The auxiliary polarizing plate 1264 transmits linear polarized light fluctuating in a predetermined direction, and the transmission axis is set so as to pass through P polarized light with respect to the polarized light isolation surface of the wire grid polarizing plate 1263 which will be described later. Hereinafter, the P polarized light with respect to the polarized light isolation surface of the wire grid polarizing plate 1263 is simply called P polarized light, and S polarized light with respect to the polarized light isolation surface of the wire grid polarizing plate 1263 is simply called S polarized light. As described above, since the polarized state is oriented to the P polarized light, in the source light passed through an integrator optical system 1410 (see FIG. 10), almost entire of green light LG penetrates the auxiliary polarizing plate 1264 and enters to the wire grid polarizing plate 1263.

The wire grid polarizing plate 1263 of the embodiment is configured by a glass substrate and a plurality of metallic wires formed thereon for example (not shown). All of the plurality of metal wires extends in one direction, and are formed on the glass substrate with intervals therebetween in approximately parallel manner. The main surface of the glass substrate on which the plurality of metallic wires are formed is the polarized light isolation surface, the extending direction of the plurality of metallic wires is a reflective axis direction, and the arrangement direction of the plurality of metallic wires is a transmission axis direction.

The O plate 55 is disposed on the light path between the wire grid polarizing plate 1263 and the liquid crystal light valve 1260 for green light. The green light LG penetrated the wire grid polarizing plate 1263 penetrates the O plate 55, the opposing substrate 20 of the liquid crystal light valve 1260 for green light subsequently, and enters to the liquid crystal layer 15. Then, the green light LG is reflected on the element substrate 10 and returned. The green light LG becomes modulated light which is modulated while penetrating the liquid crystal layer 15, and penetrates the opposing substrate 20 and O plate 55 again.

As described above, According to the liquid crystal device 100, the electronic device, and phase difference compensating plate (O plate 55) of the First Embodiment, the effects which will be described below are obtained.

(1) According to the liquid crystal device 100 and the O plate 55 of the First Embodiment, since the O plate 55 is used which satisfies the condition of the numerical expression (1), the angle of the growth direction of the columns 55b is controlled and it is difficult to be influenced by the moisture. That is, it is possible to suppress the change of the index ellipsoid caused by the humidity, and to suppress the influence of the change of the phase difference value to the contrast by realizing an appropriate optical compensation. As a result, it is possible to improve the display quality of the liquid crystal device 100. In addition, it is possible to compensate the phase difference by using the O plate 55 having a ratio of the phase difference value which is producible. Further, since the O plate 55 is used for the reflective liquid crystal device 100 which is easily affected by the pretilt by the incident light and the reflective light that pass through the liquid crystal layer 15, it is possible to suppress the influence of the contrast fluctuation to the minimum compared to the transmissive liquid crystal device.

(2) According to the electronic device of the embodiment, by providing the liquid crystal device disclosed above, it is possible to provide the electronic device in which the fluctuation of the contrast can be suppressed and the display quality can be improved.

Second Embodiment
Configuration of Liquid Crystal Device

Figure 13:
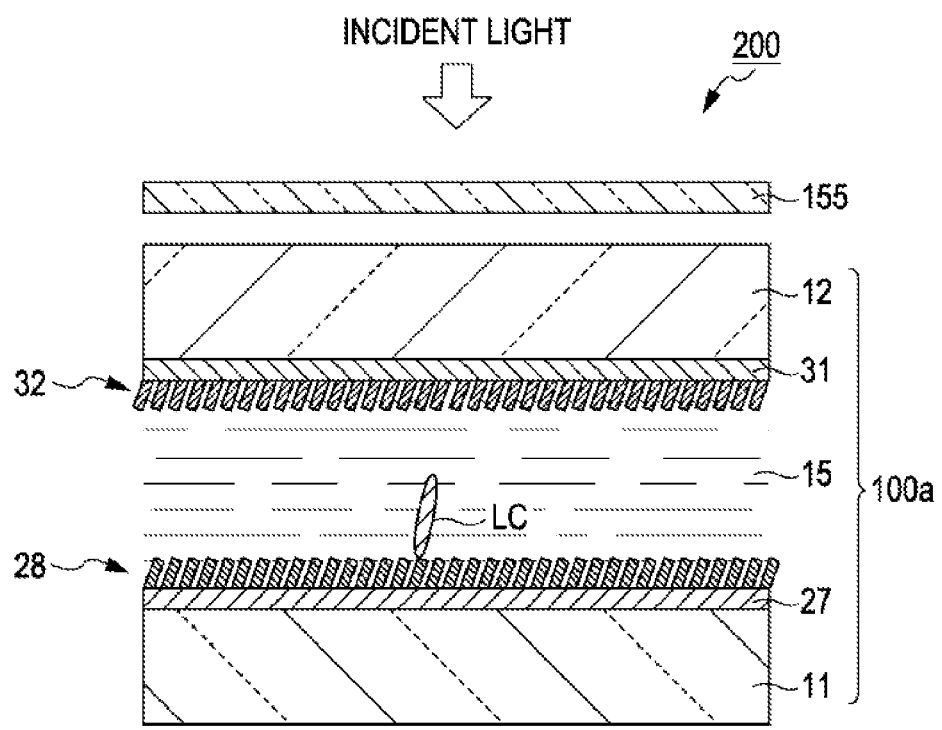
FIG. 13 is a schematic cross-sectional view showing a configuration of a liquid crystal device of a Second Embodiment.

FIG. 13 is a schematic cross-sectional view showing a configuration of the liquid crystal device of a Second Embodiment. Hereinafter, the configuration of the liquid crystal device will be described referring to FIG. 13.

In a liquid crystal device 200 of the Second Embodiment, the front surface phase difference value of the O plate is different compared to the liquid crystal device 100 of the First Embodiment, and other configurations are generally the same. Thus, in the Second Embodiment, the different parts from the First Embodiment will be described in detail, and the other overlapping parts will be appropriately omitted.

As shown in FIG. 13, in the liquid crystal device 200 according to the Second Embodiment, an O plate 155 is disposed on the emission side of the light of the liquid crystal panel 100a, as shown in the First Embodiment.

The O plate 155 of the Second Embodiment is the phase difference compensating plate including the phase difference compensating layer of which an optical axis has negative refractive index anisotropy along the thickness direction, as described above.

In the O plate 155 of the embodiment, the ratio of the phase difference value (Re ratio: Re(−30)/Re(30)) is equal to or more than 6 and equal to or less than 7, and the front surface phase difference value of the O plate in the normal direction is equal to or more than 15 nm and equal to or less than 25 nm (front surface phase difference value is controlled in a range of 20 nm±5 nm).

A method of changing the front surface phase difference value can be realized by adjusting the growth angle of the columns 55b configuring the O plate 155, for example.

FIG. 14 is a graph showing a relationship between the front surface phase difference value and the phase difference change ratio in a case of changing a ratio (Re ratio) of the phase difference value. FIG. 15 is a table showing a relationship between the ratio of the phase difference value of the O plate and contrast. Hereinafter, the optical characteristics of the O plate will be described referring to FIGS. 14 and 15.

In the graph shown in FIG. 14, the horizontal axis is the front surface phase difference value and shows 0 nm to 25 nm. Meanwhile, the vertical axis is the phase difference change ratio and shows −6% to +10%.

In detail, the graph shows the relationship between the front surface phase difference value Re(0) and the phase difference change ratio in a case where the ratio of the phase difference value (Re ratio) is "2", "4", and "6.5". In addition, the graph shows the phase difference change ratio of the front surface phase difference value after 30 minutes from when the reference temperature of the O plate 155 is changed from 25° C. to 100° C.

It is desired that the phase difference change by the change of the humidity be 0%, however, it varies by the fluctuation of the front surface phase difference value Re(0). The front surface phase difference value Re(0) of the O plate 155 fluctuates by the growth state of the columns 55b by the oblique deposition.

When the front surface phase difference value Re(0) is 20 nm and the Re ratio is 6.5, the phase difference change ratio is about 0%. In detail, even though the front surface phase difference value Re(0) is varied in the range of 15 nm to 25 nm, the phase difference change ratio can fall in a range of about −4% to about 4%.

By setting as described above, the change of the index ellipsoid of the O plate 155 with respect to the change of the humidity does not affect to the change of the front surface phase difference value. That is, by using such O plate 155, it is possible to make it difficult to be influenced of moisture. That is, even with the change of the humidity, it is possible to perform appropriate optical compensation. Accordingly, it is possible to suppress the fluctuation of the contrast.

In addition, a table shown in FIG. 15 shows a state of the contrast in a case where the ratio of the phase difference value (Re ratio) is changed while the front surface phase difference value Re(0) of the O plate 155 is constant. In detail, the table shows degree of the contrast in a case where the front surface phase difference value Re (0) is set as 20 nm and the ratio of the phase difference value is changed to "2", "4", and "6.5".

In a case where the front surface phase difference value Re(0) is set as 20 nm, when the ratio of the phase difference value is "2", the contrast is X. When the ratio of the phase difference value is "4", the contrast is Δ. When the ratio of the phase difference value is "6.5", the contrast is O. From the above result, by considering the variation of the formation of the phase difference compensating layer, when the front surface phase difference value is equal to or more than 15 nm and equal to or less than 25 nm, the ratio of the phase difference value is preferable to be equal to or more than 6 and equal to or less than 7. The phase difference change ratio can fall in a range of about −4% to about 4%.

As described above, according to the liquid crystal device 200 and the O plate 155 of the Second Embodiment, the effects which will be described below are obtained.

(3) According to the liquid crystal device 200 and the O plate 155 of the Second Embodiment, since the O plate 155 which satisfies the above described condition is used, it is possible to control the growth direction of the columns 55b and control the influence of the moisture. That is, it is possible to prevent the change of index ellipsoid from the influence of the phase difference or the like caused by the humidity. That is, it is possible to perform the optical compensation. Accordingly, it is possible to suppress the change of the phase difference value with respect to the change of the humidity and the fluctuation of the contrast. As a result, it is possible to improve the display quality of the liquid crystal device 200. In addition, it is possible to compensate the phase difference by using the O plate 155 having a ratio of the phase difference value which is producible.

Third Embodiment

Configuration of Liquid Crystal Device

Figure 16:
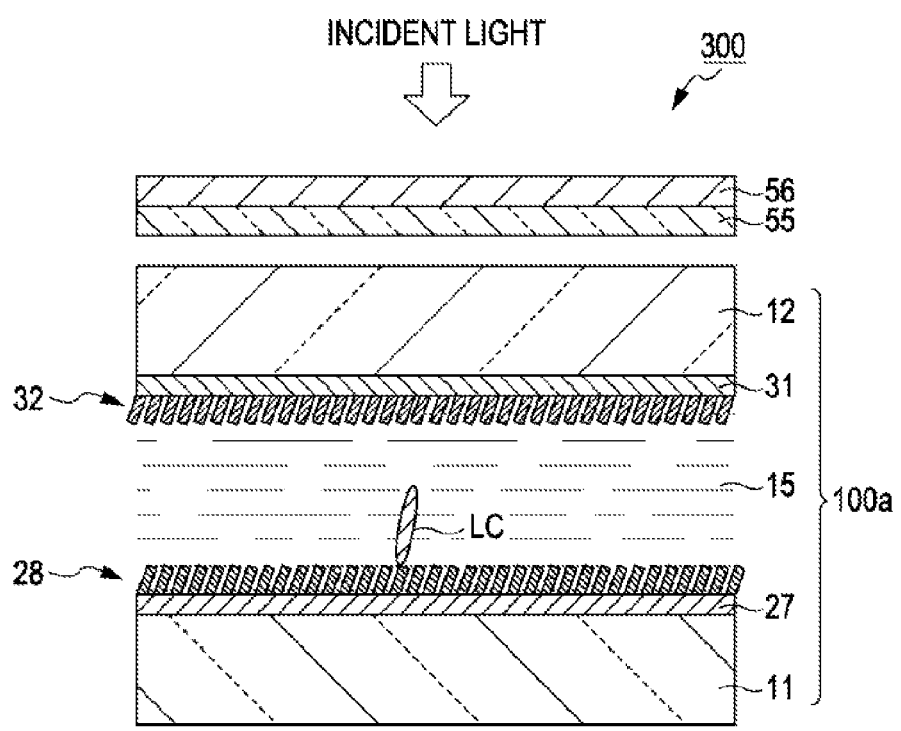
FIG. 16 is a schematic cross-sectional view showing a configuration of a liquid crystal device of a Third Embodiment.
Figure 17A:
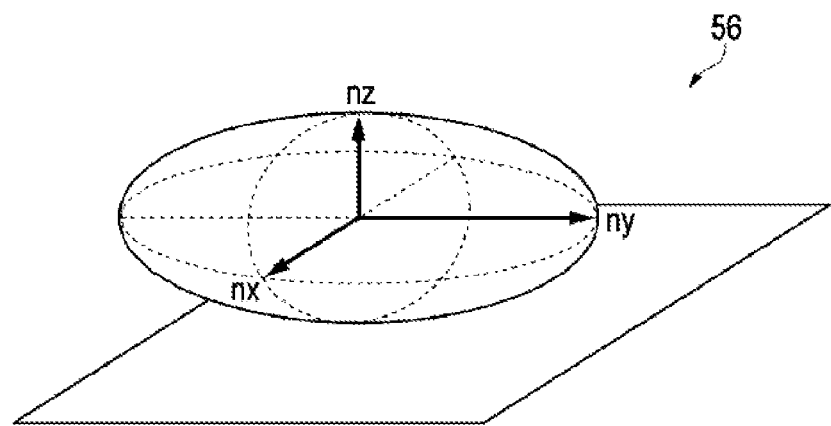
FIG. 17A is a schematic view for illustrating an optical anisotropy of a C plate.
Figure 17B:
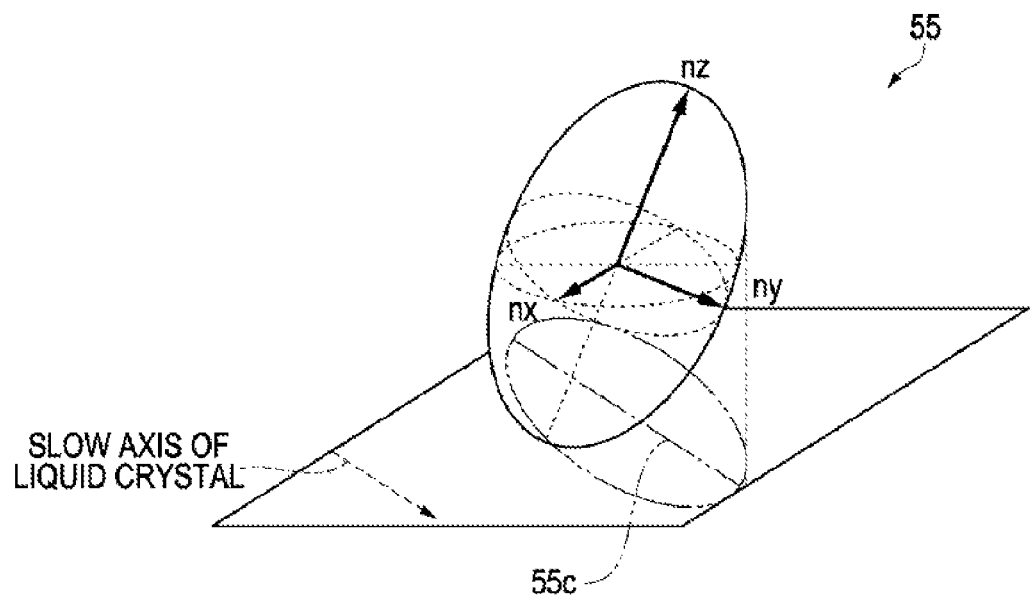
FIG. 17B is a schematic view for illustrating an optical anisotropy of an O plate.

FIG. 16 is a schematic cross-sectional view showing a configuration of a liquid crystal device of a Third Embodiment. FIG. 17A is a schematic view for illustrating an optical anisotropy of a C plate. FIG. 17B is a schematic view for illustrating an optical anisotropy of an O plate. Hereinafter, the configuration of the liquid crystal device of the Third Embodiment will be described referring to FIGS. 16 and, 17A and 17B.

In a liquid crystal device 300 of the Third Embodiment, the part which combining a C plate 56 to the O plate 55 as the phase difference compensating plate is different compared to the First Embodiment, and other configurations are generally same. Thus, in the Third Embodiment, the different parts from the First Embodiment will be described in detail, and the other overlapping parts will be appropriately omitted.

As shown in FIG. 16, in the liquid crystal device 300 of the Third Embodiment, the phase difference compensating plate is disposed on the emission side of the light of the liquid crystal panel 100a, as shown in First Embodiment. In the phase difference compensating plate of the embodiment, the O plate 55 is formed on one surface of the substrate made of quartz glass, and the C plate 56 is formed on the O plate 55. That is, in the embodiment, the C plate 56 and the O plate 55 are combined.

The C plate 56 is formed of a multilayer films which is obtained by alternately laminating a high refractive index layer and a low refractive index layer on the substrate by the sputtering or the like, and is a birefringent body in which the optical axis includes a uniaxial negative refractive index anisotropy along the thickness direction.

The C plate 56 includes an optical axis perpendicular to the surface, and compensates the phase difference of the light in the oblique direction emitted from the liquid crystal light valve 1260 (liquid crystal panel 1261) for green light. The high refractive index layer is formed of $TiO_2$, $ZrO_2$, and the like which are dielectric materials having relatively high refractive index, and the low refractive index layer is formed of $SiO_2$, $MgF_2$, and the like which are dielectric materials having low refractive index. In the C plate 56 of the configuration described above, the thickness of each refractive index layer is preferable to be thin to prevent the light penetrated the C plate from reflecting and interfering between each layer.

The C plate 56 is set so that the phase difference value Re(30) is 20 nm.

In the O plate 55 of the embodiment, the ratio of the phase difference value: Re ratio is equal to or more than 2.5 and equal to or less than 5.5, and the front surface phase difference value of the O plate 55 in the normal direction is equal to or more than 5 nm and equal to or less than 15 nm, in the same manner as the First Embodiment.

As shown in FIG. 17A as the index ellipsoid, since the relationship of refractive indexes of each direction of the C plate 56 is nx=ny>nz and isotropic with respect to the light incident to the optical axis of the C plate 56 in parallel, it is difficult to compensate the phase difference. That is, it is difficult to compensate the phase difference with respect to the light incident to the C plate 56 in orthogonal from the liquid crystal light valve 1260 for green light.

Meanwhile, among light emitted from the liquid crystal light valve 1260 for green light, for light of an oblique component, that is, an oblique component of the VA mode liquid crystal, the optical compensation is performed for the phase difference. The C plate 56 is not necessary to be completely satisfy nx=ny, and may have slight phase difference. However, in the C plate 56 shown in FIG. 17A, nx and ny denote main refractive indexes in the surface direction, and similarly, nz denotes a main refractive index in the thickness direction. Meanwhile, the configuration of the O plate 55 shown in FIG. 17B is same as the First Embodiment.

By setting as described above, the change of the index ellipsoid of the O plate 55 with respect to the change of the humidity does not affect to the change of the front surface phase difference value. That is, by using the O plate 55 described above, the angle of the columns 55b in the growth direction is controlled, and it is difficult to be influenced of the moisture. That is, even though the humidity changes, the appropriate optical compensation is performed. Accordingly, it is possible to suppress the fluctuation of the contrast. As a result, it is possible to improve the display quality of the liquid crystal device 300.

As described above, according to the liquid crystal device 300 and the phase difference compensating plate (O plate 55+C plate 56) of the Third Embodiment, the effects which will be described below are obtained.

(4) According to the liquid crystal device 300 and the phase difference compensating plate of the Third Embodiment, since the O plate 155 which satisfies the condition disclosed above is used, it is possible to control the growth direction of the columns 55b and control the influence of the moisture. That is, it is possible to prevent the change of index ellipsoid from being influenced by the phase difference or the like caused by the humidity. That is, it is possible to perform the optical compensation. Accordingly, it is possible to suppress the change of the phase difference value with respect to the change of the humidity and the fluctuation of the contrast. As a result, it is possible to improve the display quality of the liquid crystal device 300. In addition to the optical compensation by the O plate 55, since the phase difference of the light penetrating the liquid crystal layer 15 obliquely is compensated by the C plate 56, it is possible to obtain high contrast over a wide viewing angle.

The embodiments of the invention are not limited to the embodiments described above, and can be suitably modified in a range not departing a spirit or a scope of the invention that can be taken from the entire claims and specification, and is included in the technical scope of the embodiment of the invention. Moreover, it can be also realized in the following embodiment.

MODIFICATION EXAMPLE 1

Figure 18:
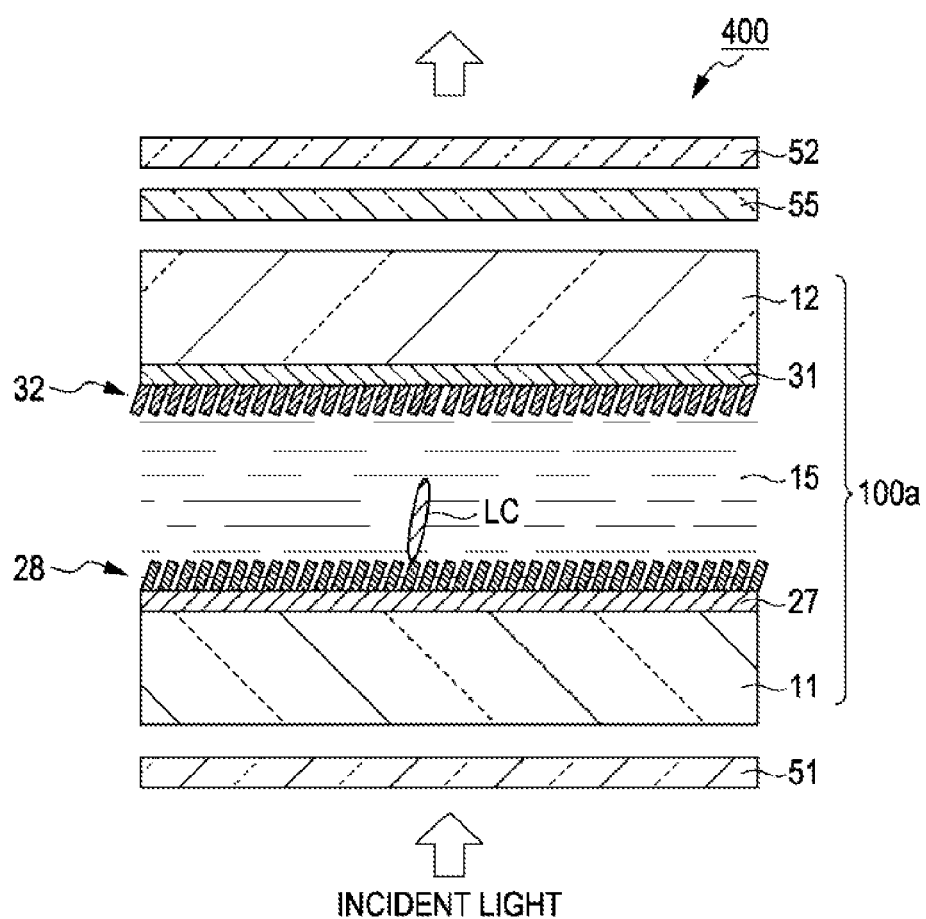
FIG. 18 is a schematic cross-sectional view showing a configuration of a liquid crystal device of modified examples.

As described above, the O plates 55 and 155 are not limited to be applied to the reflective liquid crystal devices 100 to 300, and for example, as shown in FIG. 18, the O plate 55 may be applied to a transmissive liquid crystal device 400.

According to this, even with the transmissive liquid crystal device 400 which is considered that is difficult to recognize the fluctuation of the contrast compared to the reflective liquid crystal devices 100 to 300, it is possible to suppress the change of the phase difference value with respect to the change of the humidity, and to suppress the fluctuation of the contrast. As a result, it is possible to improve the display quality of the liquid crystal device 400. That is, it is more advantageous to apply the O plates 55 and 155 of the embodiments to the reflective liquid crystal devices 100 to 300.

In addition, in a case of the transmissive liquid crystal device 400, the O plate 55 is not limited to be disposed in the emission side of the light with respect to the liquid crystal panel 100a, and for example, the O plate may be disposed in the incident side or may be disposed in both the incident side and the emission side. According to the Modification Example, since the phase difference compensating plate (O plate 55) which satisfies the condition described above is disposed between the pair of polarizing plate 51 and 52, it is possible to provide the transmissive liquid crystal device 400 in which the fluctuation of the contrast is suppressed. In addition, the light enters from the element substrate 10 side of the liquid crystal panel 100a, however the light may enter from the opposing substrate 20 side.

MODIFICATION EXAMPLE 2

In the liquid crystal devices 100 to 400, an antireflection (AR) coat may be laminated on the O plates 55 and 155 or the C plate 56.

MODIFICATION EXAMPLE 3

As described above, the projection display device 1500 (projector) has been described as an example of the electronic device, however, it is not limited thereto, and a viewer, a viewfinder, a head-mounted display, or the like are applicable. In addition, various kinds of electronic devices such as a liquid crystal television, a mobile phone, an electronic notebook, a word processor, a viewfinder type or direct-view-type video tape recorder, a workstation, a mobile type or personal computer, a videophone, a POS terminal, a pager, a calculator, a touch panel, and the like, electrophoresis devices such as electronic paper and the like, and car navigation device are applicable.

This application claims priority from Japanese Patent Application No. 2011-257162 filed in the Japanese Patent Office on Nov. 25, 2011, the entire disclosure of which is hereby incorporated by reference in its entirely.

What is claimed is:

1. A liquid crystal device, comprising:
a pair of substrates;
a liquid crystal layer that is formed of liquid crystal molecules having negative dielectric anisotropy and interposed between the pair of substrates; and
a phase difference compensating plate that is disposed in the opposite side to the liquid crystal layer of at least one of the pair of substrates, and includes a support and a phase difference compensating layer which is an assembly of columns obtained by oblique deposition of an anisotropic refractive index medium with respect to the support and has negative biaxial refractive index anisotropy,
wherein, when a front surface phase difference value of the phase difference compensating plate in the normal direction is set as x, a phase difference value of a first direction which is tilted at 30° in a direction opposite to the growth direction of the columns with the normal direction as a reference is set as Re(30), a phase difference value of a second direction which is tilted at 30° in the growth direction of the columns with the normal direction as a reference is set as Re(−30), and a ratio of Re(−30)/Re(30) is set as y, y is approximated by the following numerical expression $y=0.25x+1.5$.

2. The liquid crystal device according to claim 1, comprising:
a pair of polarizing plates which are disposed to interpose the pair of substrates therebetween,
wherein the phase difference compensating plate is disposed between the pair of polarizing plates.

3. An electronic device comprising the liquid crystal device according to claim 1.

4. A liquid crystal device, comprising:
a pair of substrates;
a liquid crystal layer that is formed of liquid crystal molecules having negative dielectric anisotropy and which is interposed between the pair of substrates; and
a phase difference compensating plate that is disposed in the opposite side to the liquid crystal layer of at least one of the pair of substrates, and includes a support and a phase difference compensating layer which is an assembly of columns obtained by oblique deposition of an anisotropic refractive index medium with respect to the support and has negative biaxial refractive index anisotropy,
wherein, in the phase difference compensating plate, a front surface phase difference value of the phase difference compensating plate in the normal direction is equal to or more than 5 nm and equal to or less than 15 nm, a phase difference value of a first direction which is tilted at 30° in a direction opposite to a growth direction of the columns with the normal direction as a reference is set as Re(30), a phase difference value of a second direction which is tilted at 30° in the growth direction of the columns with the normal direction as a reference is set as Re(−30), and a ratio of Re(−30)/Re(30) is equal to or more than 2.5 and equal to or less than 5.5.

5. A liquid crystal device, comprising:
a pair of substrates;
a liquid crystal layer that is formed of liquid crystal molecules having negative dielectric anisotropy and which is interposed between the pair of substrates; and
a phase difference compensating plate that is disposed in the opposite side to the liquid crystal layer of at least one of the pair of substrates, and includes a support and a phase difference compensating layer which is an assembly of columns obtained by oblique deposition of an anisotropic refractive index medium with respect to the support and has negative biaxial refractive index anisotropy,
wherein, in the phase difference compensating plate, a front surface phase difference value of the phase difference compensating plate in the normal direction is equal to or more than 15 nm and equal to or less than 25 nm, a phase difference value of a first direction which is tilted at 30° in a direction opposite to a growth direction of the columns with the normal direction as a reference is set as Re(30), a phase difference value of a second direction which is tilted at 30° in the growth direction of the columns with the normal direction as a reference is set as Re(−30), and a ratio of Re(−30)/Re(30) is equal to or more than 6 and equal to or less than 7.

* * * * *